POWER DRILL PIPE AND DRILL COLLAR SPIDER

Original Filed Oct. 6, 1969 5 Sheets-Sheet 1

INVENTOR
NOAL E. JOHNSON
BY John O. Evans, Jr.
ATTORNEY

POWER DRILL PIPE AND DRILL COLLAR SPIDER

Original Filed Oct. 6, 1969 5 Sheets-Sheet 2

INVENTOR
NOAL E. JOHNSON
BY John O. Evans, Jr.
ATTORNEY

POWER DRILL PIPE AND DRILL COLLAR SPIDER

Original Filed Oct. 6, 1969 5 Sheets-Sheet 3

INVENTOR
NOAL E. JOHNSON
BY John O. Evans, Jr.
ATTORNEY

POWER DRILL PIPE AND DRILL COLLAR SPIDER

Original Filed Oct. 6, 1969 5 Sheets-Sheet 4

INVENTOR
NOAL E. JOHNSON
BY John O. Evans, Jr.
ATTORNEY

POWER DRILL PIPE AND DRILL COLLAR SPIDER

Original Filed Oct. 6, 1969 5 Sheets-Sheet 5

INVENTOR
NOAL E. JOHNSON
BY John O. Evans, Jr.
ATTORNEY

United States Patent Office

Re. 27,724
Reissued Aug. 7, 1973

27,724

POWER DRILL PIPE AND DRILL COLLAR SPIDER

Noal E. Johnson, Humble, Tex., assignor to
Byron Jackson Inc., Long Beach, Calif.

Original No. 3,571,865, dated Mar. 23, 1971, Ser. No. 863,777, Oct. 6, 1969. Application for reissue June 20, 1972, Ser. No. 264,697
Int. Cl. E21b *3/04*
U.S. Cl. 24—263 DG 14 Claims

Matter enclosed in heavy brackets [ ] appears in the original patent but forms no part of this reissue specification; matter printed in italics indicates the additions made by reissue.

ABSTRACT OF THE DISCLOSURE

Power drill pipe and drill collar spider apparatus in which drill pipe slip elements and drill collar slip elements are selectively connectable to an actuator ring, the actuator ring being movable between positions at which either the drill pipe slip elements or the drill collar slip elements are disposed in the slip bowl or are retracted from the slip bowl, while the other of the slip elements are latched in retracted positions.

*CROSS REFERENCE TO RELATED APPLICATION*

*This application is an application for reissue of Pat. No. 3,571,865, issued Mar. 23, 1971, upon application Ser. No. 863,777, filed Oct. 6, 1969.*

BACKGROUND OF THE INVENTION

In the running of drill strings into and removal of drill strings from well bores, the drill string is supported in a spider device, while stands of drill collar or drill pipe are made up in or broken out of the drill string. Drill collars are relatively large and massive tubular bodies as compared with the drill pipe, and it is the general practice to provide different slips for supporting the drill collars in the spider body than the slips which are employed to support the drill pipe in the spider body. Such practice leads to problems respecting the variety and utilization of equipment on a drilling rig, especially if the rig is on an offshore platform or floating vessel employed to drill underwater wells.

The advent of special drill collars which avoid the use of the usual drill collar clamps enabled the use of slips on the drill collars, but, heretofore, the use of such drill collar slips has required either the maintenance of a special spider or the substitution of the drill collar slip for the drill pipe slip of the spider assembly.

Furthermore, the tendency of drill strings to lean to one side of the center of the well has posed problems respecting the effective engagement of the usual hinged slips with the pipe or collar, when the pipe or collar is off center. Such hinged slips comprise a pair of slip elements, hingedly connected to the sides of a center section, the hinged elements being adapted to swing about the pipe, but if the pipe is leaning in the wrong direction, effective closure of the slip assembly about the pipe has been difficult.

SUMMARY OF THE INVENTION

The present invention provides a power operated combined drill pipe and drill collar spider which avoids the above problems.

More particularly, the present invention provides a combined drill pipe and drill collar spider apparatus, including both drill pipe and drill collar slip elements which are selectively connectable to an actuator ring for movement between operative and inoperative positions. The unused slips in such apparatus are releasably latched in an inoperative position.

In addition, the slip elements are separately supported and angularly spaced about the slip bowl of the spider, so that the slips independently engage the drill pipe or drill collar at angularly spaced locations and, thereby, tend to center the pipe or collar with respect to the slip bowl, even though the pipe or collar may tend to be off center with respect to the well. In accomplishing this centering action, the slip elements are power actuated to the pipe or collar engaging position.

This invention possesses many other advantages, and has other purposes which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

DESCRIPTION OF THE PREFERRED EMBODIMENT

Figure 1:
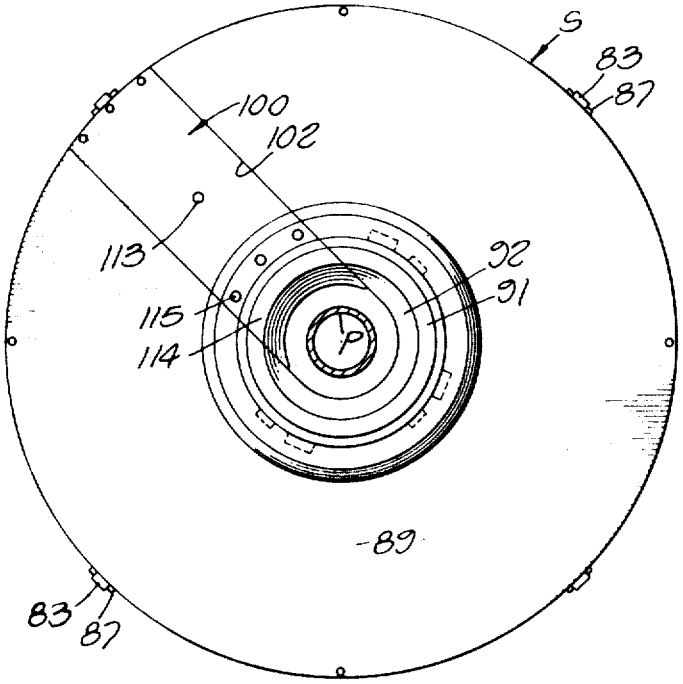
FIG. 1 is a top plan view of a combined drill pipe and drill collar spider embodying the invention.

As seen in the drawings, the spider assembly generally denoted at S is adapted to be placed upon a master bushing 1 of the usual well drilling rotary table. not shown, which is adapted to drive the well-drilling string during the drilling operations. This drill string is comprised of a number of relatively large diameter and heavy drill collars which are located just above the drill bit. The drill collars are made up in the drill string from a number of sections which are threadedly interconnected together. The drill string, from the drill collars to the top of the well, is comprised of relatively small diameter and lighter weight drill pipe which is made up of joints or sections which are threadedly interconnected.

Periodically, it becomes necessary to effect a round trip of the drill string, for example, so as to replace the drill bit. The spider assembly of the invention is adapted to support the drill string in the well bore while successive joints or sections are being removed from the drill string during pulling of the drill string or while successive joints or sections are being added to the drill string while running the drill string.

Heretofore, it has been the practice to employ drill pipe slips to support the drill string as joints or sections of the drill pipe are being made up or removed from the drill string, and special separate support means have been employed in conjunction with the drill collars. The use of the separate means to support the drill collars has required that the drill pipe slips be removed from the rotary table while the drill collars are being run.

In accordance with the present invention, the spider assembly S includes a suitable number of circumferentially spaced drill pipe slips PS which are adapted to be engaged in the tapered bore 2 of a slip bowl 3 and to engage the drill pipe P which extends vertically through the bowl 3 to support the drill string in the well bore as lengths of pipe are being removed from or added to the drill string. In addition, the spider S includes a number of circumferentially spaced drill collar slips CS which are also adapted to be engaged in the tapered bore 2 of the slip bowl 3 to support the drill collar string in the well bore lengths of drill collars are being added to or removed from the drill string.

Each of the drill pipe slips PS comprises a vertically disposed wedgelike body having an external tapered surface 4 adapted to engage with the tapered surface 2 of the slip bowl and a lower tapered surface 5 adapted to engage with the reduced, lower tapered surface 6 provided in the slip bowl 3. In the pipe engaging or front face 7 of the pipe slips PS, they are provided with a suitable number of dies 8 providing teeth 9 which are adapted to bite into the pipe P. The weight of the pipe P tightly wedges the slips PS against the tapered bowl surfaces 2 and 6. The drill collar slips CS also comprise a vertically extended body or wedge having a rear tapered surface 10 adapted to engage the slip bowl surface 2. The front faces 11 of the drill collar slips CS also are provided with drill collar engaging dies 12, having teeth 13, whereby the weight of the drill collars will tightly wedge the drill collar slips CS between a drill collar and the slip bowl surface 2.

Figure 2:
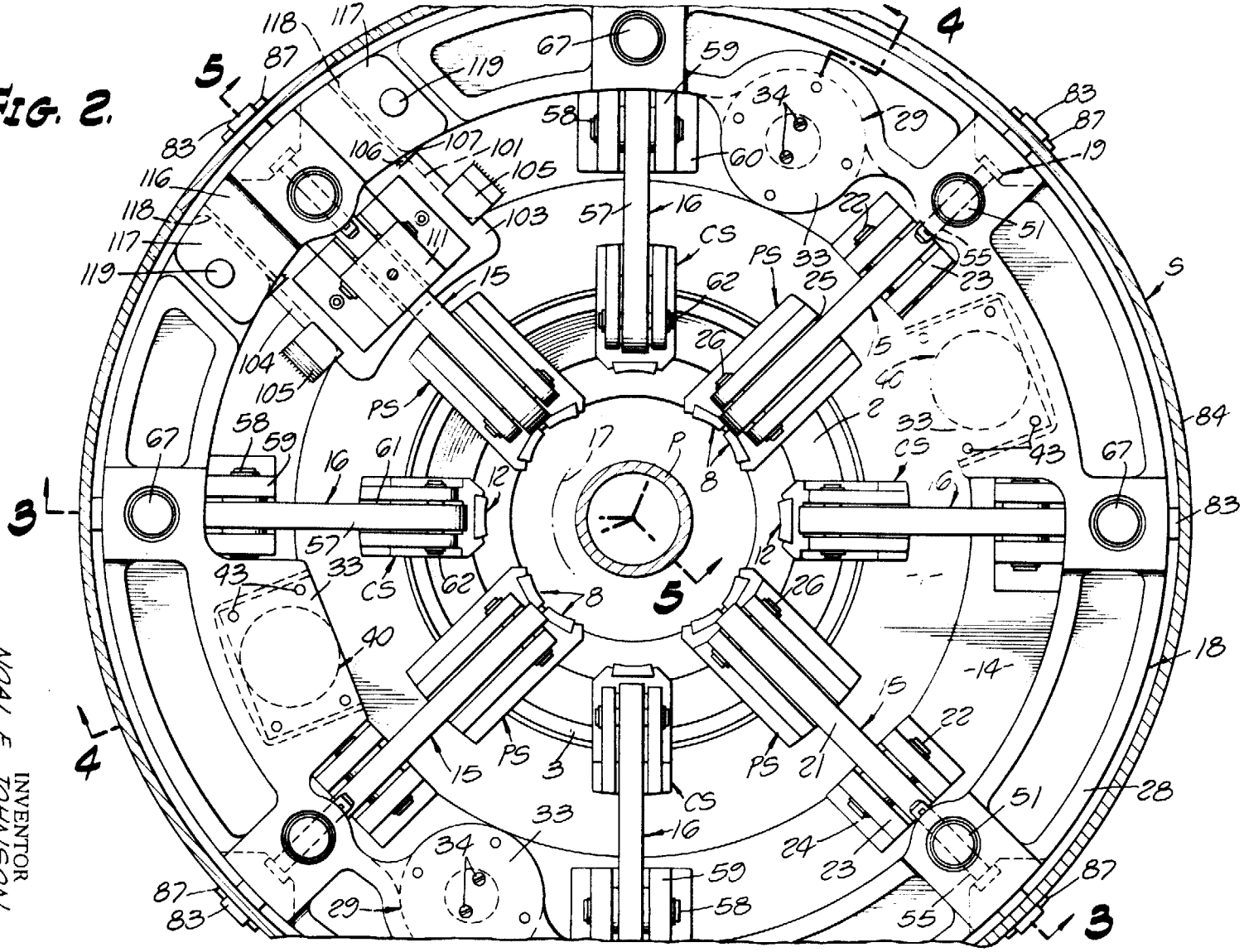
FIG. 2 is an enlarged view with the upper housing removed.

The pipe slips PS and the drill collar slips CS, per se, form no part of the present invention and cooperate with the slip bowl 3 in the usual manner. However, in accordance with the present invention, the spider assembly includes support means in the form of a plate 14 adapted to rest upon the rotary table master bushing 1 or upon other portions of the rotary table to support both the drill pipe slips PS and the drill collar slips CS for movement between retracted positions and positions engaged in the bowl 3 with the drill string. Means 15 are provided for mounting the drill pipe slips PS on the support means for movement between the retracted positions of FIGS. 2 and 3, for example, and the drill pipe engaging position shown in FIG. 10. Correspondingly, means 16 are provided for mounting the drill collar slips on the support plate 14 for movement between the retracted positions shown in the drawings and a position engaged with a drill collar, the extent of inward movement of the drill collar slips CS for engagement with a drill collar (not shown) being represented by the arcuate broken line 17 shown in FIGS. 2, 3 and 10.

In addition, operating means 18 are provided for moving the respective pipe slips PS and drill collar slips CS between the just mentioned retracted positions and the positions engaged with the pipe or drill collar, as the case may be.

Means 19 are provided for selectively connecting either the drill pipe slips PS or the drill collar slips CS to the operating means 18; and latch means 20 are provided for selectively releasably latching those slips which are not connected to the operating means in the retracted positions.

The means 15 for mounting the drill pipe slips on the support plate 14, in each case, comprises an elongated lever 21 which is pivotally connected between its ends on a pivot pin 22 which extends between a pair of upstanding arms 23 of a bracket 24, the bracket being suitably affixed to the support plate 14. At its inner end, the lever 21 extends into a groove 25 in the upper end of the pipe PS and is connected to the pipe slip by a pin 26 extending through the groove 25 and through an elongated slot 27 in the lever 21.

Figure 4:
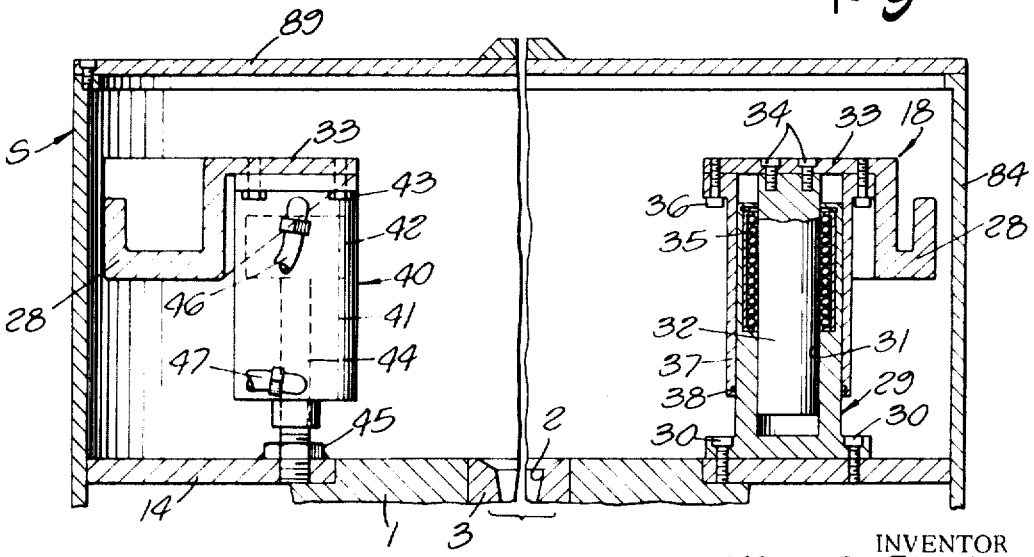
FIG. 4 is a vertical section as taken on the line 4—4 of FIG. 2.

The operating means 18 includes a ring 28 which is horizontally disposed about the axis of the assembly. This ring 28 is supported for vertical reciprocation on a suitable number of angularly spaced posts 29 (see FIGS. 2 and 4), which are mounted on the support plate 14 as by suitable fasteners 30. Each post 29 has a bore 31 in which is reciprocally disposed a complemental rod 32 which is secured beneath a flange 33 of the ring 28 by suitable fasteners 34. A ball bearing or other bearing structure 35 is interposed between the rod 32 and the post 29. Also, depending from the flange 33 of the ring 28 and secured thereto by fasteners 36 is a sleeve 37 having a seal ring 38 slideably engaged with the post 29 to prevent the entry of drilling fluid or the like into the assembly. In the illustrated embodiment, a pair of posts 29 located in diametrically spaced relation are employed to support the ring 28.

In order to effect vertical movement of the ring 28 actuator means are provided comprising, in the illustrated embodiment, a number of angularly spaced double-acting fluid-pressure-responsive actuators 40, each including a cylinder 41 in which a piston 42 is reciprocable. The cylinder 41 is connected to a flange section 33 of the ring 28 by suitable fasteners 43, and the piston 42 includes a rod 44 which extends from the cylinder 41 and is threaded into a nut 45 which is welded or otherwise affixed to the support plate 14. Thus, the ring 28 is guided on the posts 29 and is actuated vertically in either direction by fluid from a pair of press-fluid conduits 46 and 47 which respectively lead into the cylinder 41 above and below the actuator piston 42.

The means 19 for connecting the lever 21 of each of the pipe slips PS to the operating ring 28 includes a link 48 pivotally connected at 49 to the outer end of the lever 21 and pivotally connected at 50 to a connector rod 51 which extends into a vertical bore 52 formed in the ring 28. The ring 28 has radially extended bores 53 and 54 intersecting the vertical bore 52 and aligned for reception of a key or pin 55 which is adapted to extend through the bores 53 and 54 in the ring 28 and through a transverse bore 56 in the connector rod 51, so as to interconnect the rod 51 with the ring 28. When the connector rod 51 is pinned by the pin 55 to the operating ring 28, upward and downward movement of the ring 28, under the influence of the actuators 40, will effect pivotal movement of the levers 21 to move the pipe slips PS vertically into and out of the tapered slip bowl 3.

Each of the means 16 for mounting the drill collar slips CS on the support plate 14 includes an elongated lever 57 which is pivotally mounted between its ends on a pivot pin 58 extending between a pair of upstanding arms 59 formed on brackets 60 which are suitably affixed to the support plate 14. Each of the levers 57 is connected to a drill collar slip CS and extends into a groove 61 at the upper end of the drill collar slip CS. A pin 62 extends through the groove 61 and through an elongated slot 63 in the inner end of the lever 57. A link 64 is pivotally connected at 65 to the outer end of each lever 57 and is pivotally connected at 66 to a connector rod 67 which extends into a vertical bore 68 in the operating ring 28.

Figure 9:
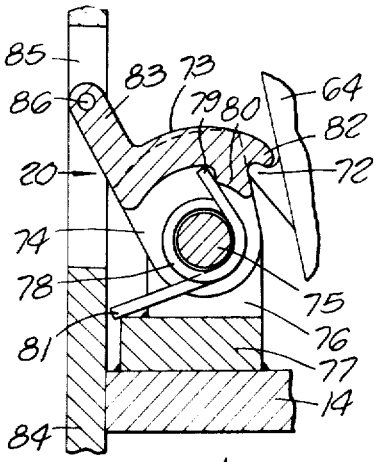
FIG. 9 is a vertical section as taken on line 9—9 of FIG. 8.
Figure 8:
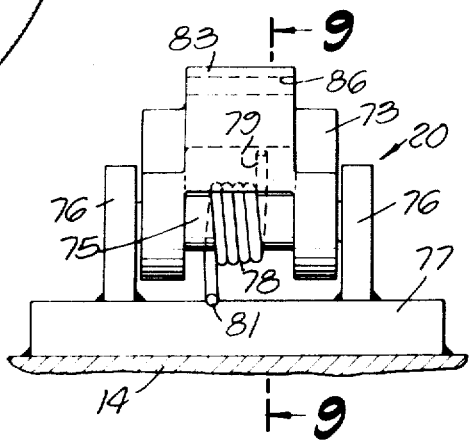
FIG. 8 is a detailed view, partly in section and partly in elevation, of a typical latch for holding a slip in a retracted position as taken on the line 8—8 of FIG. 3.

In the absence of a pin 55 connecting either the pipe slip connector rod 51 or the drill collar slip connector rod 67 to the operating ring 28, the latter will reciprocate vertically relative to the connector rod 51 or 67, as the case may be, and in such case, the latch means 20, previously referred to, may be employed to selectively latch the pipe slips PS or the drill collar slips CS in the retracted positions. A typical latch means is illustrated to best advantage in FIGS. 8 and 9. Each latch means will be seen to comprise a latch lug 72 provided on the links 48 and 64. Engageable with the latch lug 72 is a pivotal latch body 73 having a section 74 which is pivotally mounted upon a pin 75. This pin 75 extends between a pair of support ears 76 which are vertically upwardly extended from a baseplate 77, the latter being suitably affixed to the support plate 14. A torsion spring 78 is coiled about the pin 75 and engages at one end 79 with an abutment 80 on the latch body 73. The other end 81 of the spring 78 abuts with the baseplate 77, and, thus, the spring acts to normally bias the latch body 73 in a direction for effecting engagement of a lip 82 on the body 73 with the latch lug 72 on one of the links 48 or 64. A handle 83 projects from the latch body 73 to enable manual shifting of the latch body 73 to disengage the lip 82 from the latch lug 72.

The assembly, thus far described, is adapted to be included within a housing 84 having side openings 85 adjacent to the respective latch means 20 to facilitate manual manipulation of the latch means. When a latch handle 83 is moved to the position at which the latch means are released, the handle 83 projects through the openings 85 and is adapted, by the provision of a transverse hole 86, to receive a retainer pin 87 which will bridge the openings 85 and hold the latch released.

The housing 84 also includes side access openings 88 through which the pins or keys 55 may be inserted or removed when it is desired to connect a set of slips PS or CS to the operating ring 28 or to disconnect such slips. A top plate 89 forms a part of the housing 84 and has a central opening 90 in which is removably disposed a guide ring 91 having at least an outwardly tapered guide surface 92 adapted to facilitate the stabbing of the drill string therethrough. This guide ring 91 overlies the retracted slips PS and CS so as to protect the same from engagement by the drill string.

In the use of the spider assembly, it may be desirable to remove the same from the rotary table or to apply the same to the rotary table, while a length of drill string extends into the well bore. Accordingly, the assembly includes a radially extended gate portion 100 which is removably attached to the assembly.

Figure 5:
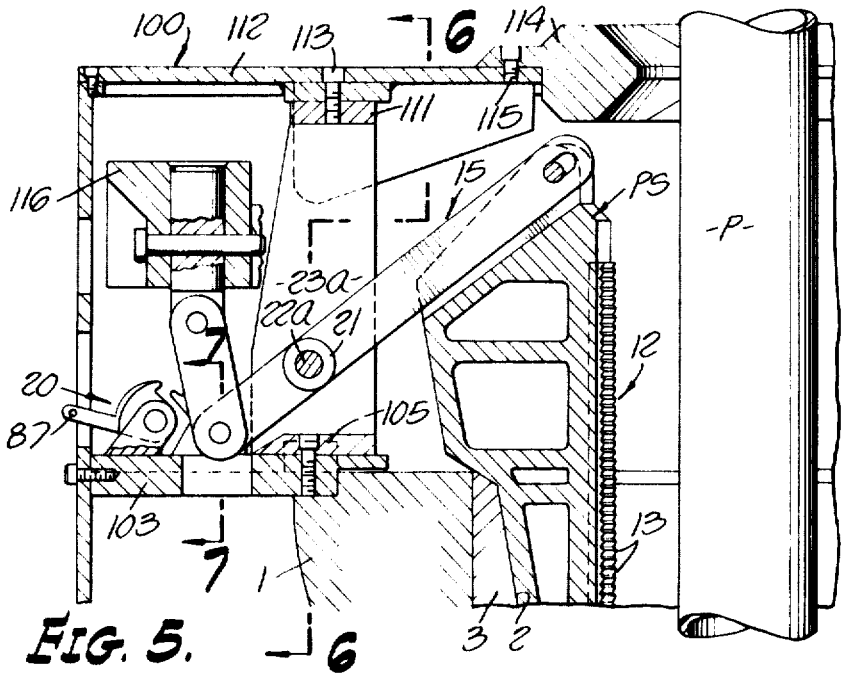
FIG. 5 is a fragmentary vertical section as taken on the line 5—5 of FIG. 2.
Figure 6:
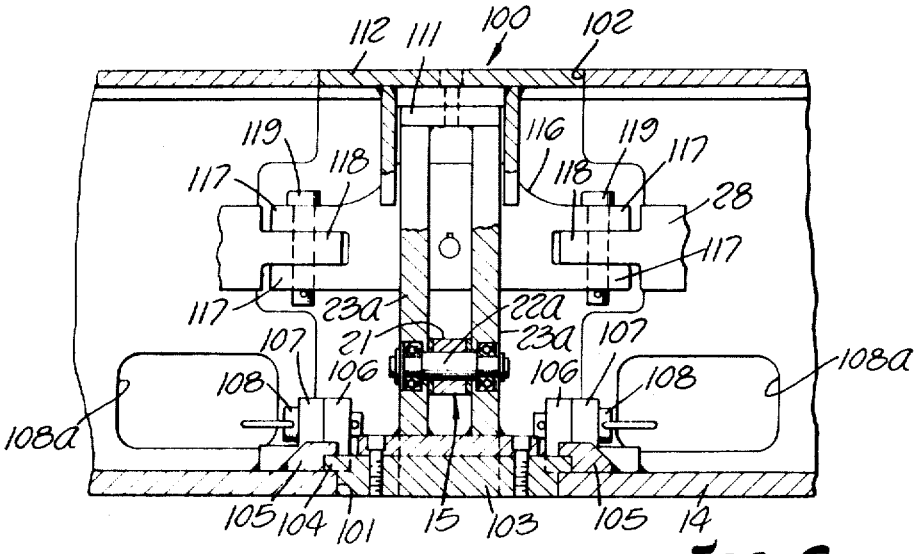
FIG. 6 is a vertical section as taken on the line 6—6 of FIG. 5.
Figure 7:
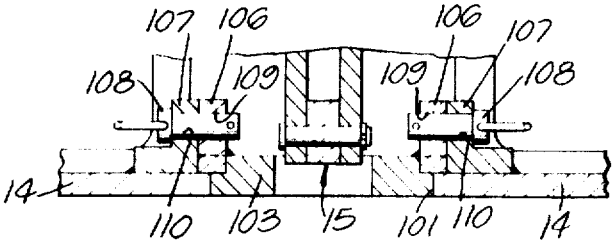
FIG. 7 is a fragmentary vertical section as taken on the line 7—7 of FIG. 5.

Referring to FIGS. 5 through 7, it will be seen that the support plate 14 at the opposite sides of the slot 101. The 89 has a radial slot 102. The removable section 100 is disposed in these slots 101 and 102. More particularly, the removable section 100 includes a base plate 103 adapted to fit in the slot 101 and having side flanges 104 adapted to be received in guide blocks 105 which are welded to the support plate 14 at the opposite sides of the slot 101. The base plate 103, at its opposite sides, has a pair of upstanding ears 106, and the guides 105 have a pair of upstanding ears 107 adapted to be disposed in adjacent relation, whereby retainer pins 108 may extend through aligned openings 109 and 110 in the ears 106 and 107, respectively.

One of the drill pipe slips PS is carried by the removable section 100 along with its lever 21, and accordingly, for rigidity, the arms 23a which support the lever 21 on the pivot pin 22a extend vertically upwardly and have a top plate 111 welded thereto, and the removable section 100 includes a removable section 112 of the cover plate 89 suitably connected to the plate 111 by fastener means 113. Likewise, the guide 91 hace a segment 114 connected by fasteners 115 to the removable cover plate section 112.

As seen in FIG. 6, the operating ring 28 also is provided with a removable segment 116. This segment 116 of the ring 28 has ears 117 at it ends adapted to receive tongues 118 at the ends of the main body of the operating ring 28, and pins 119 are adapted to extend through the ears 117 and the tongues 118 to interconnect the ring segment 116 with the main body of the operating ring 28.

The housing 84 has additional side access openings 108a for enabling removal of the pins 108 and the pins 119 whereby the entire removable section 100 is released so as to be laterally removable from the assembly, following which the assembly is laterally removable from the pipe P or the drill collar, should this be necessary or desirable.

Figure 3:
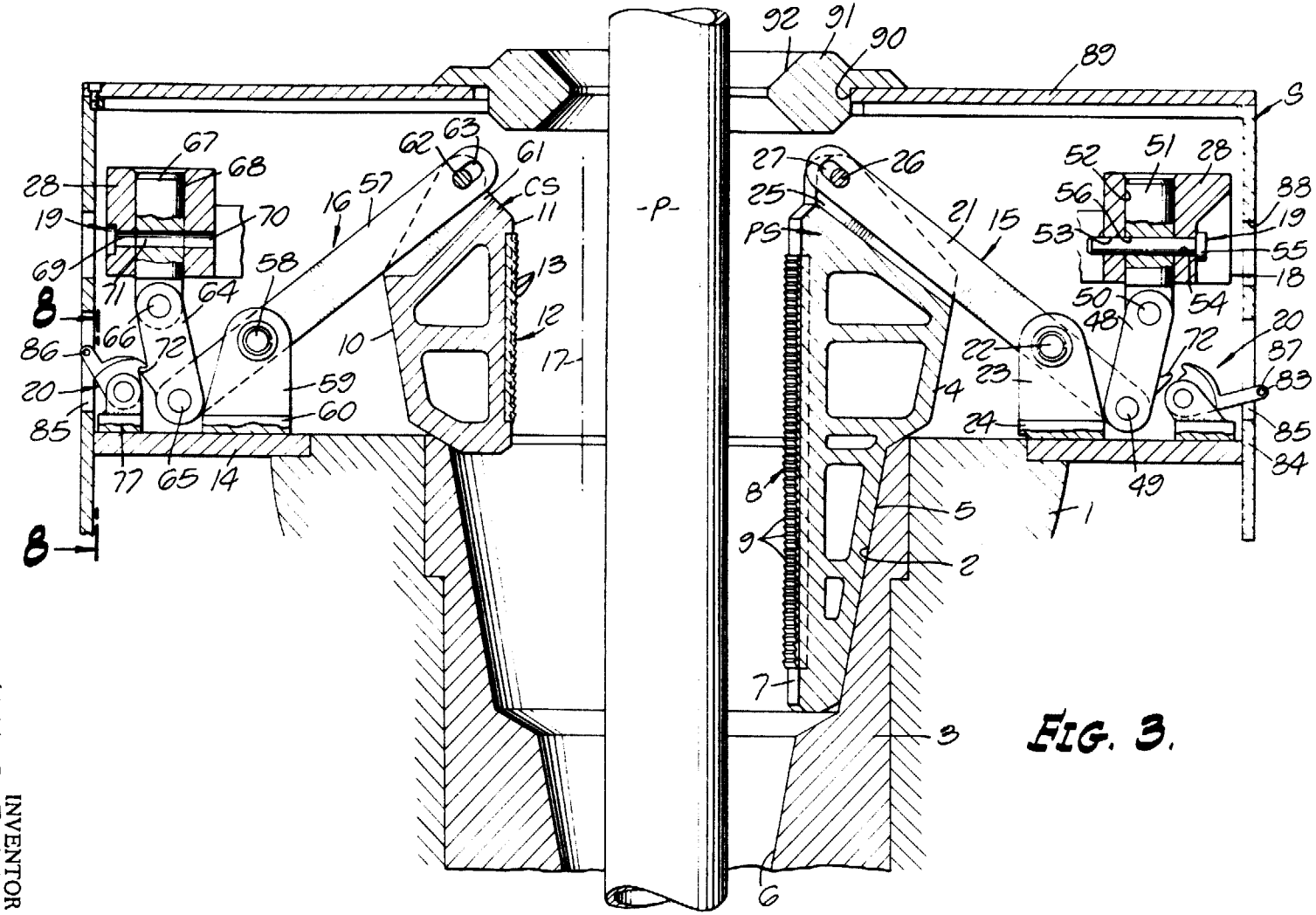
FIG. 3 is a vertical section as taken on the line 3—3 of FIG. 2.
Figure 10:
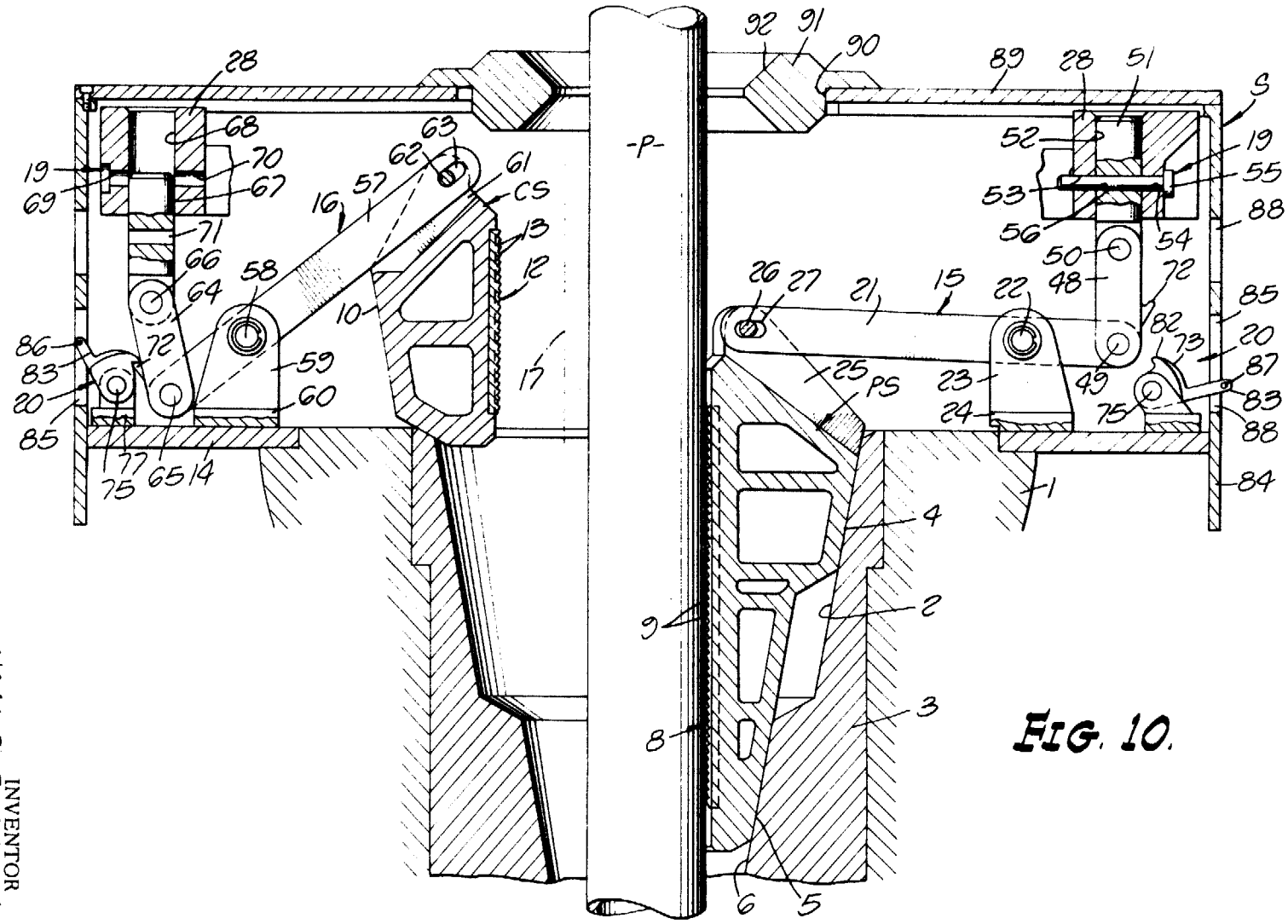
FIG. 10 is a vertical section corresponding to FIG. 3, but showing a drill pipe slip engaged with a length of drill pipe.

In the use of the combined drill pipe and drill collar spider for the running in or removal of drill pipe in a well bore, all of the levers 57 which support the drill collar slips CS will be latched in the positions shown in FIGS. 3 and 10, with the drill collar slips retracted. Under these circumstances, no pin, such as the pin 55, is employed to connect the connector rod 67 to the operating ring 28, and accordingly, the rods 67 are reciprocable in the bores 68. When it is desired to set the pipe slips PS in engagement with the drill pipe P, fluid under pressure is supplied through the conduit 46 to the actuator 40 above the piston 42 to forcibly move the operating ring 28 upwardly. If the pipe P is off center with respect to the assembly, force is provided by the resultant downward and inward movement of the pipe slips PS to centralize the pipe P, as the pipe slips PS move downwardly and inwardly for wedging engagement between slip bowl 3 and the pipe P. Conversely, when it is desired to release the pipe slips PS to allow movement of the pipe P into or from the well bore, fluid is supplied through the conduit 47 to the actuator 40 below the piston 42, so as to force the operating ring downwardly and through the lever 21 to move the pipe slips PS upwardly and outwardly to their retracted positions.

When it is desired to employ the drill collar slips CS, the operating ring 28 is shifted downwardly so as to align the radial bores 69 and 70 in the operating ring 28 with the respective bores 71 in the connector rods 67, and then keys 55 are inserted to interconnect the means 16 with the operating means 18. In addition, the retainer pins 87 are pulled from the latch arms 83 of each of the latch means 20 which hold the pipe slip latch means released so that such latch means will be engaged. The pins 55 are then removed from the operating ring 28 and each of the connector rods 51. Thereupon, the latch means for the respective drill collar slips CS are released and latched in released condition by the pins 87, and the drill collar slips CS may then be actuated as described with respect to the drill pipe slips PS.

From the foregoing, it will now be apparent that the invention provides a combined drill pipe and drill collar spider assembly wherein, with convenience and dispatch, the apparatus is adaptable for utilization to releasably support different size pipes within the slip bowl 3.

I claim:

1. A combined drill collar and drill pipe spider comprising: a slip bowl having a downwardly tapered vertical opening for drill collars and drill pipe, support means disposed about said opening, a plurality of drill slips spaced about said opening, means mounting said drill collar slips on said support means for movement between a drill collar engaging position in said opening and a retracted position, a plurality of drill pipe slips spaced about said opening, means mounting said drill pipe slips for movement between a drill pipe engaging position in said opening and a retracted position, means for selectively holding each of said slips in a retracted position, operating means for moving said slips between said positions, and means for selectively connecting said drill collar slips and said drill pipe slips to said operating means for operation by the latter.

2. A combined drill collar and drill pipe spider as defined in claim 1, wherein the means mounting each of said slips on said support means comprises a lever pivotally mounted between its ends, one of said slips being connected to one end of said lever, and said means for selectively connecting said slips to said operating means being connected to the other end of said lever.

3. A combined drill collar and drill pipe spider as defined in claim 1, wherein the means for mounting each of said slips on said support means comprises a lever pivotally mounted between its ends, one of said slips being connected to one end of said lever, and said means for selectively holding each of said slips in a retracted position comprises latch means carried by said support means and the other end of said lever.

4. A combined drill collar and drill pipe spider as defined in claim 1, wherein said operating means comprises a ring, means for mounting said ring on said support means for vertical movement of said ring to move said slips between said positions, and means for shifting said ring vertically.

5. A combined drill collar and drill pipe spider as defined in claim 1, wherein said operating means comprises a ring, means for mounting said ring on said support means for vertical movement of said ring to move said slips between said positions, and power means for shifting said ring vertically in opposite direction.

6. A combined drill collar and drill pipe spider as defined in claim 1, wherein said operating means comprises a ring, means for mounting said ring on said support means for vertical movement of said ring, said means for selectively connecting each of said slips to said operating means comprising a rod connected to a slip, a bore in said ring reciprocably receiving said rod, and pin means selectively engageable with said rod to hold said rod against movement in said bore.

7. A combined drill collar and drill pipe spider as defined in claim 1, wherein said support means includes a radially removable section removably connected to said spider, one of said slips and its mounting means being carried by said removable section.

8. A combined drill collar and drill pipe spider as defined in claim 1, wherein said support means includes a radially removable section removably connected to said spider, one of said slips and its monuting means being carried by said removable section, and said operating means includes a ring having a removable segment·

9. A combined drill collar and drill pipe spider as defined in claim 1, wherein said support means includes a plate having a radial slot, a plate section removably disposed in said slot, said plate and said plate section having portions disposable in adjacent relation and having alignable openings, pin means engageable in said openings to secure said plate section in said slot, one of said slips and its mounting means being carried by said plate section.

10. A combined drill collar and drill pipe spider as defined in claim 1, wherein said support means includes a plate having a radial slot, a plate section removably disposed in said slot, said plate and said plate section having portions disposable in adjacent relation and having alignable openings, pin means engageable in said openings to secure said plate section in said slot, one of said slips and its mounting means being carried by said plate section, said operating means comprising a ring, said ring having a removable segment, said ring and said segment having portions provided with alignable openings, and pin means engageable in said latter openings to connect said ring segment to said ring.

11. A combined drill collar and drill pipe spider as defined in claim 1, wherein said operating means comprises a ring, and post and sleeve means carried by said support means and said ring and coengaged to guide said ring vertically.

12. A combined drill collar and drill pipe spider as defined in claim 1, wherein said operating means comprises a ring, means guiding said ring for vertical movement, and double-acting fluid-pressure-operated actuator means between said ring and said support means for moving said ring vertically in opposite directions.

*13. A combined drill collar and drill pipe spider comprising: a slip bowl having a downwardly tapered vertical opening for drill collars and drill pipe, support means disposed about said opening, a plurality of drill collar slips spaced about said opening, means mounting said drill collar slips on said support means for movement between a drill collar engaging position in said opening and a retracted position, a plurality of drill pipe slips spaced about said opening, means mounting said drill pipe slips for movement between a drill pipe engaging position in said opening and a retracted position, means for selectively holding each of said slips in a retracted position, and operating means for moving one plurality of said plurality of drill collar slips and said plurality of drill pipe slips between its retracted position and its drill collar and drill pipe engaging position respectively while the other of said plurality of drill collar slips and said plurality of drill pipe slips is in a retracted position.*

*14. A combined drill collar and drill pipe spider comprising: a slip bowl having a downwardly tapered vertical opening for drill collars and drill pipe, support means disposed about said opening, a plurality of drill collar slips spaced about said opening, means mounting said drill collar slips on said support means for movement between a drill collar engaging position in said opening and a retracted position, a plurality of drill pipe slips spaced about said opening, means mounting said drill pipe slips for movement between a drill pipe engaging position in said opening and a retracted position, and operating means for moving one plurality of said plurality of drill collar slips and said plurality of drill pipe slips between its retracted position and its drill collar and drill pipe engaging position respectively while the other of said plurality of drill collar slips and said plurality of drill pipe slips is in a retracted position.*

References Cited

The following references, cited by the Examiner, are of record in the patented file of this patent or the original patent.

UNITED STATES PATENTS

| | | | |
|---|---|---|---|
| 1,111,535 | 9/1914 | Greve | 24—263 C A |
| 1,356,458 | 10/1920 | Moody | 24—263 D J |
| 2,143,849 | 1/1939 | Gordy | 24—263 S C |
| 2,183,526 | 12/1939 | Abegg | 24—249 D P |
| 2,282,758 | 5/1942 | Gallagher | 24—263 C A |
| 2,545,627 | 3/1951 | Moore | 24—263 D G |
| 2,636,241 | 4/1953 | Liljestrand | 24—263 D G |
| 3,457.605 | 7/1969 | Kingsbury et al. | 24—263 D G |

DONALD A. GRIFFIN, Primary Examiner

UNITED STATES PATENT OFFICE
CERTIFICATE OF CORRECTION

Patent No. Re 27,724 Dated August 7, 1973

Inventor(s) Noal E. Johnson

It is certified that error appears in the above-identified patent and that said Letters Patent are hereby corrected as shown below:

Column 5, lines 40-43 "Referring to Figs. 5 through 7, it will be seen that the support plate 14 at the opposite sides of the slot 101. The 89 gas a radial slot 102." should read, -- Referring to Figs. 5 through 7, it will be seen that support plate 14 has a radial slot 101 and the top cover 89 has a radial slot 102 --.

Column 5, line 60, cancel "hace" and insert -- has --.

Signed and sealed this 2nd day of April 1974.

(SEAL)
Attest:

EDWARD M.FLETCHER,JR.
Attesting Officer

C. MARSHALL DANN
Commissioner of Patents

USCOMM-DC 60376-P69
☆ U.S. GOVERNMENT PRINTING OFFICE : 1969 O—366-334.